INVENTOR.
Robert J. Teitel
BY
Edward E. Schilling
AGENT

Nov. 9, 1965   R. J. TEITEL   3,216,901
FUEL ELEMENT AND METHOD OF OPERATING REACTOR
Filed Aug. 24, 1960   2 Sheets-Sheet 2

INVENTOR.
Robert J. Teitel
BY
Edward E. Schilling
AGENT

United States Patent Office 3,216,901
Patented Nov. 9, 1965

3,216,901
FUEL ELEMENT AND METHOD OF OPERATING REACTOR
Robert J. Teitel, Midland, Mich., assignor to The Dow Chemical Company, Midland, Mich., a corporation of Delaware
Filed Aug. 24, 1960, Ser. No. 51,605
11 Claims. (Cl. 176—13)

The invention relates to fuel elements for nuclear reactors containing a liquid fuel and to a method and apparatus therefor.

It has long been a desideratum in the nuclear reactor field to provide a practical reactor which is not only inherently safe to operate, regardless of mechanical or power failure, but is also readily started up, regulated, and shut down.

Such a reactor may now be assembled and operated using the novel fuel element of the present invention, some associated apparatus, liquid fuel containing fissionable material, and the method of the present invention for handling liquid fuel hereinafter more fully described, reference being had to the appended drawings.

In the said drawings—

Figure 1:
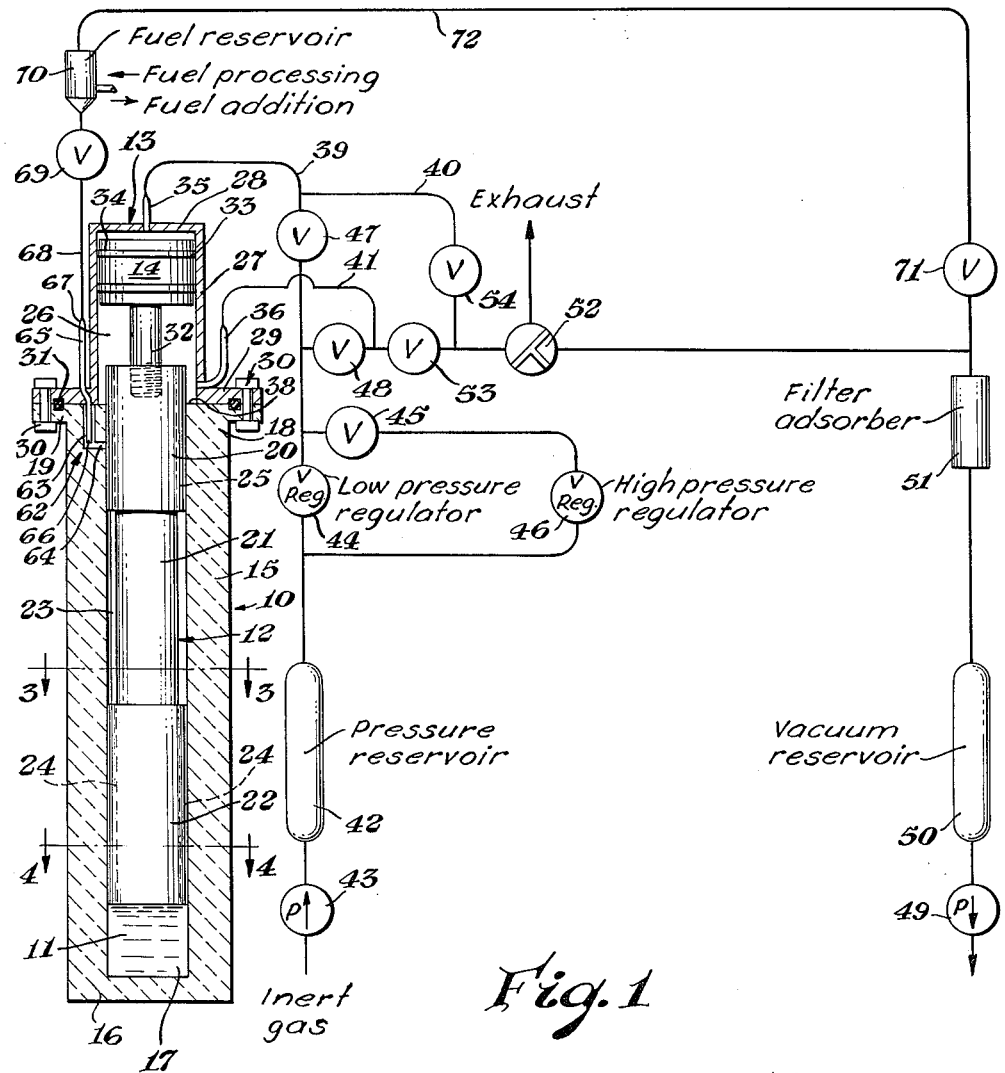
FIG. 1 is a view in side elevation, mostly in section, of the fuel element of the present invention in the "reactor off" position, associated piping and services being shown schematically.

Referring now more specifically to the drawings, in which like numbers refer to like parts, the fuel element of the invention, as shown in FIG. 1, consists of a fuel element shell, indicated generally by the numeral 10, liquid fuel 11 disposed within the fuel element shell 10, a plunger indicated generally by the numeral 12, which slideably telescopes into the fuel element shell 10, a cover, indicated generally by the numeral 13, which closes the assembly, and, attached to plunger 12, a piston 14 which slideably engages the cover 13 and provides means for raising and lowering the plunger 12.

The fuel element shell 10 is formed of an appropriate fluid impervious material and consists of an elongated, heavy-walled hollow body of hexagonal or other suitable cross section, e.g., square or circular, having sidewalls 15 and a closed bottom 16 which define an axially aligned cavity 17 which is coextensive with the sidewalls 15. The cavity 17 is preferably of circular cross section though other configurations may be used, if desired.

The lowest part of the cavity 17 serves as a reservoir for the liquid fuel 11.

Liquid fuel which may be used in the present apparatus contains fissionable material such as $U_{235}$, $U_{233}$, or Pu as (1) an aqueous solution, (2) a fusible saline mixture, or (3) an alloy of the fissionable material in a readily fusible metal having a low neutron cross-section, such as lead or bismuth, or a bismuth-lead alloy.

The upper end 18 of the fuel element shell 10 terminates in an integrally formed radially outwardly extending flange 19. Telescoped into the cavity 17 is the plunger 12 which is adapted to be reciprocated freely in the cavity and float on the liquid fuel 11, if the fuel is sufficiently dense, unless thrust thereinto. The plunger 12 consists of an elongated rod having an upper section 20, a middle section 21, and a lower section 22. The upper and lower sections 20, 22, fit the inside of cavity 17, closely, though slideably, and have substantially the same cross-sectional configurations as the cavity shape. The middle section 21, has a smaller cross section thereby providing an annular space 23 between the middle section 21 and the fuel element sidewalls 15. One or more longitudinal peripheral grooves 24, which extend the length of the lower section 22, of the plunger 12 provide communication between the liquid fuel 11, and the annular space 23. Similar grooves 25 provide communication between the annular space 23 and the space 26 above the plunger 12. Thus, sections 20 and 22 have similar configurations.

Figure 3:
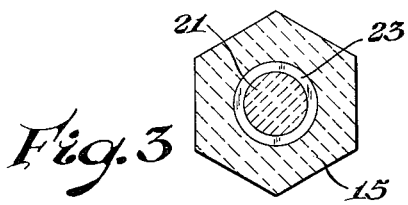
FIG. 3 is a transverse sectional view of the fuel element shown in FIG. 1, the view being taken along line 3—3 to show the relationship of a fuel displacement plunger, the surrounding fuel element shell, and the annular space therebetween.
Figure 4:
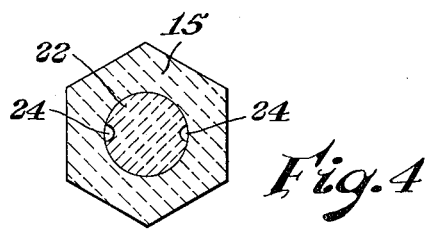
FIG. 4 is another transverse sectional view of the fuel element assembly shown in FIG. 1, the view being taken along line 4—4 to show the relationship of the fuel displacement plunger and the surrounding fuel element shell.

The relationship of the middle section 21, to the sidewalls 15 of the fuel element shell 10 are more clearly understood by referring to the cross-sectional view shown in FIG. 3. Cross-sectional view FIG. 4 illustrates the relationship of the lower section 22 to the sidewalls 15 as well as the peripheral location of the longitudinal grooves 24 in the lower section 22. The grooves 25 are similarly located in the upper section 20.

Referring again to FIG. 1 it may be seen that the cover 13 consists of a hollow cylinder having sidewalls 27 and a closed upper end 28. The lower end of the cover is provided with an integrally formed radially outwardly extending flange 29 which mates with flange 19 of the fuel element shell 10 and is held thereagainst in airtight sealing relation by suitable connectors, such as nut and bolt assemblies 30. If desired, an O-ring 31 may be employed to improve the seal between the flanges. The cover 13 is preferably formed in a manner to permit the attachment of gas and vacuum lines as well as to provide a durable apparatus.

Pneumatic piston 14 it attached to and axially aligned with the upper end of the upper section 20 of the plunger 12, by means of a connecting member 32. Connecting member 32 is in the form of a bar or rod which is threadably attached or otherwise connected to both the piston 14 and plunger 12. The piston 14 is mounted so as to be disposed within the cylindrical cover 13 and slideably engages the sidewalls 27 thereof by means of one or more piston rings 33. The piston rings 33 are retained about the piston 14 by peripheral annular grooves 34, as well understood in the mechanical arts. The grooves 34 are more clearly illustrated in FIG. 5.

The piston 14 which is connected to the plunger 12, is actuated in a vertical direction by gas pressure supplied either (1) above the piston via a pipe or tube 35 which extends through the closed upper end 28 of the cover 13 and is sealed thereto as by welding, or (2) below the piston via a similar pipe 36 which extends through the sidewalls 27 of the cover 13 adjacent the flange 29 and is sealed to the sidewall as by welding.

Upward movement of the piston 14 and the plunger 12 is assisted by the buoyant lift of the liquid fuel 11. When the liquid fuel is a high density liquid such as a liquid metal fuel consisting of a molten alloy of uranium, bismuth and lead, the buoyant lift is sufficient to lift the plunger 12 so that substantially all of the liquid fuel drains out of the annular space 23 without the assistance of the pneumatic piston. This is desirable in the event it is necessary to bring the plunger 12 to the "reactor off" position during a power failure.

However a similar result can be achieved without the use of a high density liquid fuel. The effect of buoyancy can be simulated by placing around connecting member 32 a spring, 37, shown in dotted outline in FIG. 2, which is seated on a shoulder or boss 38 provided on the inner edge of the face of flange 19 and is adapted to urge piston 14 upwardly.

As shown schematically in FIG. 1, either positive gas pressure or relatively reduced gas pressure may be provided as desired above or below the piston 14 by a pressure train and a vacuum train which are both connected to pipe 35 via pneumatic lines 39 and 40, and to pipe 36 via pneumatic line 41.

The pressure train is supplied by a source of inert gas, not shown, which may be cylinders of helium, argon, and the like or recycled inert gas from the vacuum train. Inert gas is pumped into a pressure reservoir 42 by a compressor 43. The compressed gas is conveyed via a low pressure regulator 44 when valve 45 is closed or via a high pressure regulator 46 when valve 45 is open, to valve 47, which is in communication with the pneumatic line 39, and with a valve 48. The valve 48 in turn communicates with pneumatic line 41.

The vacuum train consists of a vacuum pump 49, vacuum reservoir 50, a filter adsorber 51 adapted to retain fission product gases, and a three-way valve 52 which is connected by pneumatic lines to valves 53 and 54. Valve 53 is in communication with pneumatic line 41 and with valve 48. Valve 54 is in communication with penumatic line 39 via connecting pneumatic line 40.

Figures 2, 5:
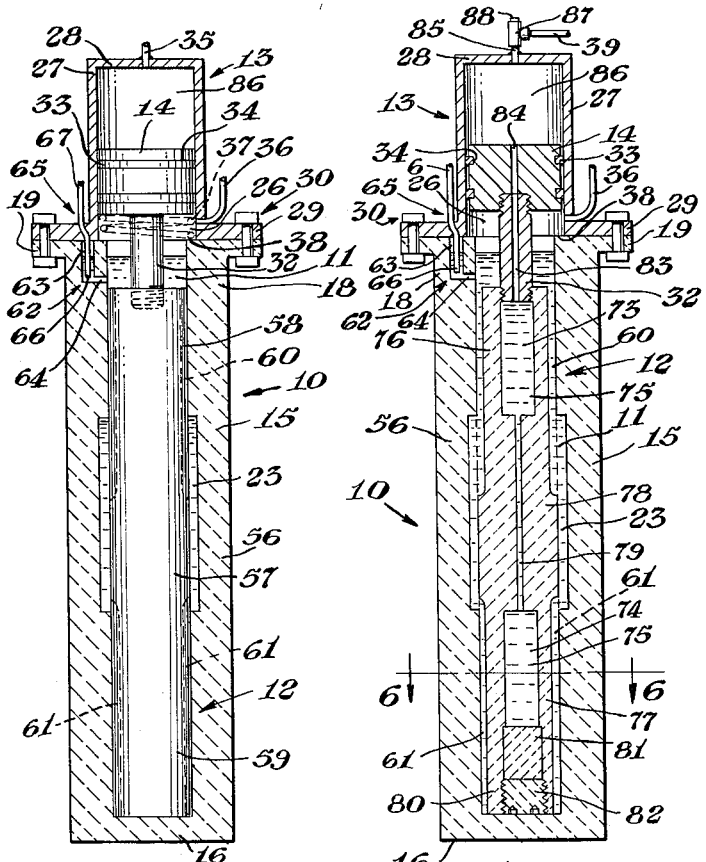
FIG. 2 is a view in side elevation, partly in section, of the same fuel element with the movable parts in the "reactor on" position.
FIG. 5 is a view in side elevation, mostly in section, of a different embodiment of the fuel element of the invention employing a hollow fuel displacement plunger.

In FIGURE 2 there is shown an embodiment of the fuel element of the invention having a form of plunger and complementary fuel element shell which differ essentially from the corresponding parts shown in FIG. 1 in having the annular space 23 between the plunger 12 and the sidewalls 15 of the fuel element shell 10 provided by a recessed section 56 in the shell rather than in the plunger. The plunger 12 is an elongated regular cylinder, which is similar to the plunger shown in FIG. 1 except the center section 57 is shorter and of the same diameter as the upper section 58 and the lower section 59. The longitudinal grooves 60 along the upper section 58 and similar grooves 61 along the lower section 59, both shown in dotted outline, provide communication between the annular space 23 and the ends of the plunger 12.

As shown in FIG. 2, the plunger 12 is in the "reactor on" position. The plunger 12 has moved some liquid fuel 11 by positive displacement from the lowest part of cavity 17 (cavity 17, being shown completely filled by the plunger 12 in FIG. 1), up through the grooves 61, to the annular spaces 23, and through grooves 60 to the space 26 above the plunger 12. By arraying a group of fuel elements in the "reactor on" position, a critical configuration for the liquid fuel contained in a series of annular spaces 23 is achieved.

In this configuration the liquid fuel 11 is in a relatively moderated zone, i.e., the liquid metal fuel is intimately and adequately enough associated with a moderator material, such as a plunger and fuel element shell formed of graphite or beryllium, that a high proportion of the neutrons formed in the fuel in the arrayed fuel elements have sufficient opportunity to pass through moderator material and lose energy so as to become "thermal" neutrons. Thus there is met, as well understood in the reactor art, one of the requirements for providing a greater supply of thermal neutrons. If the supply is sufficient it is possible to sustain a nuclear chain reaction.

Upon allowing the plunger 12 to rise by its own buoyancy, or upon lifting the plunger 12 pneumatically by means of inert gas pressure applied below piston 14, the liquid fuel 11 is allowed to return to the lower part of cavity 17 and the plunger 12 floats or is held just above the fuel as shown in FIG. 1. In this non-critical configuration the liquid fuel is not as intimately associated with moderator material, fewer thermal neutrons are provided in the region of the liquid fuel, i.e., it is relatively unmoderated, and a chain reaction is not sustained in an array of a group of fuel elements in the "reactor off" position.

With the fuel element as depicted in FIG. 1, upon depressing the plunger 12 the fuel is displaced to the annular space 23 and a configuration similar to FIG. 2 is obtained.

The means by which liquid fuel 11 is added to or removed from the fuel element is best understood with reference to both FIG. 1 and FIG. 2.

When the liquid fuel 11 is displaced well up into the space 26 by depressing the plunger 12 to the bottom 16 of the fuel element shell 10, as shown in FIG. 2, the fuel 11 flows into a passageway, indicated generally by the numeral 62, which is formed in the sidewall 15 of the upper end 18 of the fuel element shell 10. The passageway 62, consists in part of a hole 63, which is bored or otherwise formed in the sidewall 15 of the fuel element shell normal to the face of the flange 19, and in part of a second hole 64 which is bored radially outward from the inside surface of the sidewall to a point of intersection with the hole 63. The hole 63 is located away from the radially inward side of flanges 19 and 29 so that the two flanges meet and seal all around the hole, preventing communication with space 26 except via the hole 64.

A tube 65 extends through the flange 29 and is sealed thereto. One end 66 of the tube 65 projects into the hole 63 substantially the length thereof and dips into the liquid fuel 11 when the fuel is displaced above the plunger 12. The other end 67 of the tube 65, as shown schematically in FIG. 1, is connected by piping 68 and a control valve 69 to a fuel reservoir 70. Liquid fuel may be removed from the reservoir for processing. Fresh or reprocessed fuel may be brought into the fuel element via the reservoir. The reservoir 70 is best physically located at a slightly higher elevation than the fuel element so that fuel in the reservoir can be added to the fuel element by gravity flow. By limiting liquid levels in the reservoir above the plunger 12 according to the density of the liquid fuel, the liquid fuel may be removed from the fuel element by vacuum, e.g., a bismuth-lead alloy cannot be lifted by vacuum more than about 3 feet. Pumping of the fuel is thus avoided.

The addition of fuel 11 to the fuel element is accomplished by opening control valve 69 while the reservoir 70 is not under reduced pressure. If desired, valve 69 may be a freeze valve rather than a mechanical valve. In carrying out the said removal of fuel from the fuel element by vacuum, liquid fuel 11 which is disposed in the passageway 62 by virtue of being displaced above the plunger 12, is drawn into the reservoir 70 by opening both the control valve 69 and the valve 71 in the pneumatic line 72 which is connected to the vacuum train.

In yet another embodiment of the fuel element of the invention provision is made for an internal location of blanket material. In this location the blanket material can be exposed to a higher neutron flux.

Referring now to FIG. 5 an embodiment of the present novel fuel element is shown in which the fuel displacement plunger 12 consists of a cylindrical body having the same external shape as the plunger shown in FIG. 2, but differs therefrom in being provided with internal axially aligned interconnected cavities 73 and 74 containing a liquid metal blanket 75 such as a dispersion of thorium in bismuth, lead or bismuth-lead alloy. The modified plunger 12, then, consists of an upper portion 76 containing the first cavity 73, a lower portion 77 containing the second cavity 74, and a middle portion 78 provided with a passageway 79 which interconnects the cavities 73 and 74.

The cavities 73 and 74 are conveniently formed by drilling a hole from each end of the plunger along the axis and coextensive with the upper and lower portions 76 and 77. Then the connecting passageway 79 is formed as by drilling a smaller hole entirely through the middle portion 78 along the axis of the plunger.

The hole drilled in the lower portion 77 is slightly enlarged or counterbored throughout part of the length of the hole starting from the end of the plunger and a part of the so-enlarged hole is threaded immediately adjacent the lower end 80 of the plunger. A short cylindrical plug 81 is then press fit into the enlarged hole and held in place by an externally threaded piece 82. Piece 82 is usually threaded into place.

The hole in the upper portion 76 of the plunger 12 is threaded or otherwise prepared to receive and hold the connecting member 32 by which the piston 14 is threadably attached to the plunger. The connecting member may be attached to the piston in other ways, if desired, e.g., by being press fit into a cavity therein and carbonized thereto.

As shown, in this embodiment, the connecting member 32 and the piston 14 are provided with aligned passages 83 and 84 respectively. The passage 83 in the connecting member 32 communicates with the cavity 73.

Liquid metal blanket disposed in the smaller centrally disposed passageway 79 is exposed to a higher neutron flux than it would outside the reactor core region. The blanket is also exposed to relatively high temperatures when the fuel element is a part of an array of similar fuel elements each having the fuel displacement plunger in the "reactor on" position, i.e., with the fuel displaced into the annular space around the middle portion of the plunger. The cavities 73 and 74 serve as reservoirs and the blanket material circulates therebetween through passageway 79 by convection.

Figures 6, 9:
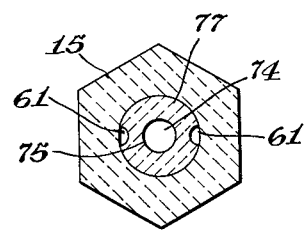
FIG. 6 is a transverse sectional view of the full element shown in FIG. 5, the view being taken along line 6—6.
FIG. 9 is a fragmentary side view, partly in section, of a type of piston and connecting member employed in the apparatus of the invention to actuate the plunger.

In FIG. 6, the sectional view taken along the line 6—6 in FIG. 5 shows the relationship of the axially aligned cavity 74 in the lower section 77 of the plunger 12, the longitudinal peripheral grooves 61 in the lower section 77, and the surrounding sidewalls 15 of the fuel element shell 10.

Referring again to FIG. 5, liquid metal blanket material is added to or removed from the plunger 12 via piping attached to the upper end 28 of the fuel element cover 13. The piping consists of a short pipe nipple 85, one end of which extends just through the center of the upper end 28 of the fuel element cover 13 and is sealed thereto. The pipe nipple 85 communicates with the space 86 above the piston 14 and is aligned with the passageways 83 and 84 in the piston and the connecting member 32. The other end of the pipe nipple 85 is attached in communication with a pipe T 87. A plug 88 threadably closes the side of the pipe T 87 opposite the pipe nipple 85. The pneumatic line 39 is connected to the sidearm of the pipe T.

Upon removing the plug 88 from the pipe T 87 and inserting a probe in the form of an elongated metal tube, not shown, having a diameter somewhat smaller than the pipe nipple 85 and the passageways, 83 and 84, liquid metal blanket material 75 can be added to the cavities 73 and 74 or withdrawn by applying a vacuum to the probe.

In another embodiment of the apparatus of the invention which is similar to that shown in FIG. 5, there is employed a plunger provided with internal cavities in which liquid metal blanket material is simply held throughout the useful life of the fuel element. In this embodiment the connecting member 32, as shown in FIG. 9, is not pierced throughout the entire length thereof by passageway 83.

The passageway 83 intersects a transverse hole 89 formed through the connecting member 32 adjacent the piston 14. Fission product gases formed during irradiation of the blanket material escape from the plunger via the passageway 83 and transverse hole 89 to the space 26 surrounding the connecting member 32.

Figure 7:
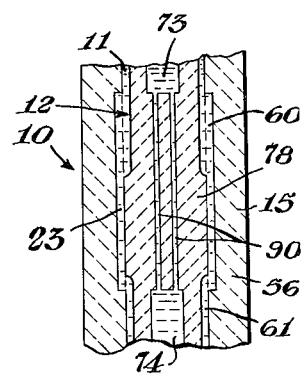
FIG. 7 is a fragmentary view in side elevation and in section showing the center portion of a fuel element similar to that shown in FIG. 5 but having a different form of hollow fuel displacement plunger.

Another form of plunger 12 having cavities 73 and 74 provided therein for holding liquid metal blanket material is shown in FIG. 7. This form of plunger is provided with two passageways 90 which interconnect the cavities 73 and 74 and facilitate a greater amount of thermal convection of the blanket material.

Figure 8:
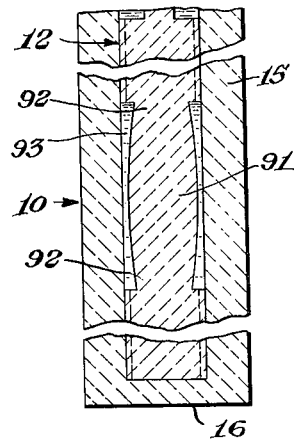
FIG. 8 is a foreshortened fragmentary view in side elevation and in section showing the plunger and associated fuel element shell of a fuel element similar to that shown in FIG. 1 but having yet a different form of displacement plunger.

In FIG. 8 there is shown a portion of the apparatus of the invention including a modified fuel displacement plunger 12 having a center portion 91 of reduced cross section. In contrast to the plunger of FIG. 1, the plunger here exhibits a non-uniform reduction in cross section which is greatest at the ends 92 of the center portion 91 so that there is created between the center portion and the surrounding fuel element shell an annular space 93 which also varies in thickness, being correspondingly thicker in the radial direction as the diameter of the plunger portion is smaller. This configuration is of advantage when it is desired to obtain both a relatively uniform thermal neutron and heat flux from top to bottom of the annular space region of the fuel element. The variation in thickness of the annular space necessary to obtain a "flat," i.e., uniform, neutron flux depends on the type and concentration of fuel employed and on the geometry of the plunger and fuel element shell, as well as the surrounding elements in a reactor, but these are readily computed from a knowledge of reactor physics.

If desired, the variation in thickness in the annular space may also be accomplished, when using a perfectly uniform cylindrical plunger, by undercutting instead the walls of the fuel element shell in a corresponding fashion, viz., to produce an annular space which has the greatest radial thickness, i.e., annular cross section, at the ends of the center portion of the plunger when it is in the "reactor on" position.

A reactor capable of attaining criticality is built up by assembling an array of the fuel elements of the invention in side by side relation along with interspersed units which make provision for cooling the array, or extracting useful heat therefrom, as well as providing heat during the startup period in the event the fuel has to be melted. In such an array of fuel elements the length of the annular space, e.g., the annular space 23 as shown in FIG. 1, may advantageously be varied from fuel element to fuel element and the fuel elements with the longest annular space located in the middle of the array, and those fuel elements with increasingly shorter annular spaces placed further and further radially outwardly from the center. In this manner a reactor having a highly efficient spherical core region can be built up from the fuel element of the invention.

The fuel element of the invention, as indicated hereinabove is controlled by raising and lowering the fuel displacement plunger 12 by means of a piston 14. Referring now to FIG. 1 the piston 14 is actuated by applying pneumatic pressure above the piston and, if desired, simultaneously reducing the pneumatic pressure below the piston. Pneumatic pressure is applied through pipe 35 via pneumatic line 39 upon building up helium or argon pressure in the pressure reservoir 42 by means of the pump 43. The valves 45 and 47 are opened and valves 48 and 54 are closed. Then the high pressure regulator 46 is adjusted to supply the requisite amount of pneumatic pressure, via line 39, to push the piston-plunger assembly down until the plunger reaches the bottom 16 of the fuel element shell 10. In this manner the fuel 11 is displaced into the annular space 23 which is in the core region in an array of such fuel elements assembled to form a reactor. The downward movement of the piston 14 is resisted by the natural buoyancy of the plunger 12 in the liquid fuel 11.

The pneumatic pressure differential across the piston 14 is increased, if desired, by reducing the gas pressure below the piston, i.e., in space 26. This is accomplished by employing vacuum pump 49 to evacuate the vacuum reservoir 50. Upon opening three-way valve 52 to the line but not to exhaust, and then opening valve 53, gas in space 26 is withdrawn through pipe 36 to pneumatic line 41 and thence to the vacuum train.

It is preferred that the piston rings 33 of the piston 14 are rather slightly loose fitting to the inside of the fuel element cover 13 in order that inert gas constantly leaks by the rings into space 26. In this manner, upon steadily evacuating space 26 to the vacuum train, volatile fission products in gaseous form are swept into the vacuum train and collected in the filter adsorber 51. Filter adsorber 51 usually contains activated charcoal which is cooled to temperatures in the range of $-80$ to $-200°$ C.

In order to conserve the inert gas used, it is general practice to employ a single compressor rather than a separate pressure pump and vacuum pump. The single compressor evacuates the vacuum train and supplies compressed gas to the pressure train.

To raise the plunger 12 by pneumatic means valve 47 between the pressure train and pneumatic line 39, and valve 53 between the vacuum train and pneumatic line 41, are closed and valve 48 is opened so that pneumatic pressure is applied below the piston 14 upon supplying pneumatic pressure, e.g., via regulator 46 and valve 45. The lifting force on the piston 14 can be increased by opening valve 54 and evacuating the space above the piston.

If the liquid fuel is relatively dense or if a spring is employed to give the plunger a simulated buoyant lift, the plunger can be raised simply by closing valves 47, 48, and 52, and opening valves 53 and 54, thereby equalizing pneumatic pressure above and below the piston.

In any event, upon causing the plunger 12 to rise, liquid fuel 11 sinks via grooves 24 and 25 to the bottom part of the fuel element shell 10 where the fuel is out of the core region.

There has thus been provided a nuclear reactor fuel element for liquid fuel reactors which is inherently safe, and readily started up, regulated and shut down.

While various modifications of the present invention herein described may be obvious to one skilled in the art, the invention is to be considered limited only by the hereinafter appended claims.

I claim:

1. A nuclear reactor fuel element which comprises: a relatively unmoderated reservoir for liquid fuel, a plunger associated with said reservoir, a moderated zone associated with said plunger, and pneumatic piston means including a piston reciprocable within a complementary cylindrical space in a container, said pneumatic piston means being attached to said plunger and adapted to move said plunger into said reservoir thereby to transfer liquid fuel from said reservoir to said moderated zone by positive displacement, and said cylindrical space being in communication with said reservoir.

2. A nuclear reactor fuel element which comprises: a relatively unmoderated reservoir for liquid fuel, a plunger associated with said reservoir, a moderated zone associated with said plunger, means for moving said plunger into said reservoir to transfer liquid fuel from said reservoir to said moderated zone by positive displacement, said pneumatic piston means, including a piston reciprocable within a complementary cylindrical space, being in communication with said reservoir, and liquid fertile blanket material disposed within said plunger so as to be within said moderated zone when said plunger is moved into said reservoir.

3. A nuclear reactor fuel element which comprises: a relatively unmoderated reservoir for liquid fuel, a plunger associated with said reservoir, a moderated zone associated with said plunger, means for moving said plunger into said reservoir to transfer liquid fuel from said reservoir to said moderated zone by positive displacement, and upper and lower reservoirs for liquid fertile blanket material and at least one connecting passageway therebetween said upper and lower reservoirs within said plunger, said connecting passageway being disposed within said plunger so as to be within said moderated zone when said plunger is moved into said reservoir.

4. A nuclear reactor fuel element which comprises: a relatively unmoderated reservoir for liquid fuel, a plunger associated with said reservoir, a moderated zone associated with said plunger, means for moving said plunger into said reservoir to transfer liquid fuel from said reservoir to said moderated zone by positive displacement, liquid fertile blanket material disposed within said plunger so as to be within said moderated zone when said plunger is moved into said reservoir, and means for withdrawing said fertile blanket material from said plunger and removing said fertile blanket material from said fuel element.

5. A nuclear reactor fuel element which comprises: a relatively unmoderated reservoir for liquid fuel, a plunger associated with said reservoir, a moderated zone associated with said plunger, pneumatic piston means for moving said plunger into said reservoir to transfer liquid fuel from said reservoir to said moderated zone by positive displacement, liquid fertile blanket material disposed within said plunger so as to be within said moderated zone when said plunger is moved into said reservoir, and means for conducting out of said liquid fuel element gaseous fission products formed in said fertile blanket material under neutron irradiation.

6. In the operation of a nuclear reactor fuel element in which liquid fuel in a fuel element shell is displaced from a lower non-critical region adjacent the bottom of the fuel element shell to a higher reactor core region by a fuel displacement plunger slideably disposed within the fuel element shell, the improved manner of depressing the fuel displacement plunger which comprises: providing pneumatic piston means attached to the upper end of said fuel displacement plunger and applying a greater pneumatic pressure above the pneumatic piston means than below it thereby to force the pneumatic piston and attached fuel displacement plunger downwardly overcoming the buoyancy of the liquid fuel, said pneumatic piston means including a piston reciprocable within a complementary cylindrical space in a container, said cylindrical space being in communication with said liquid fuel in said higher reactor core region.

7. In a nuclear reactor fuel element having a fuel element shell which is closed at the bottom end and defines an elongated cavity; liquid fuel disposed in the bottom of said cavity; a fuel displacement plunger slideably disposed in said shell immediately above said fuel; said shell and said plunger being shaped so as to define an annular space therebetween about midway between the ends of said shell; said plunger having a plurality of longitudinal surface grooves thereon extending from the bottom end of said plunger to said annular space; the improved means for depressing said plunger into said fuel and forcing the fuel up into said annular space which comprises: a pneumatic piston axially aligned with said plunger and attached to the upper end thereof by a connecting member; a cover for said shell defining a cylindrical cavity which is adapted to slideably receive said piston in substantially sealing engagement against the flow of a gas, said cover having a closed upper end, sidewalls, and flange means adapted to mate with and seal against the upper end of the fuel element shell; means for attaching said cover to said shell; means for supplying pneumatic pressure to the said cavity via the closed upper end of the cover and means for evacuating and pressurizing the said cavity via the sidewalls of the cover adjacent the said flange means, thereby to pneumatically control the vertical movement of said fuel displacement plunger.

8. In the operation of a nuclear reactor fuel element in which the liquid fuel in a fuel element shell is displaced from a lower non-critical region adjacent the bottom of the fuel element shell to a higher reactor core region consisting of an annular space surrounding a fuel displacement plunger slideably disposed in said fuel element shell and movable into said liquid fuel to displace it into said annular space, the improved method of exposing liquid metal blanket material to a neutron flux in said fuel element which comprises: placing said liquid metal blanket material within said fuel displacement plunger so as to be disposed radially inwardly from said annular space when liquid fuel is displaced into said annular space.

9. In a nuclear reactor fuel element in which the liquid fuel in a fuel element shell is displaced from a lower non-critical region adjacent the bottom of the fuel element shell to a higher reactor core region consisting of an annular space surrounding a fuel displacement plunger slideably disposed in said fuel element shell and movable into said liquid fuel to displace it into said annular space, the improvement which comprises: providing within said fuel displacement plunger an upper and lower cavity both adapted to hold liquid metal blanket material above and below the reactor region respectively; a passageway within said fuel displacement plunger interconnecting said upper and said lower cavity; and means for removing gaseous fission products from said upper cavity.

10. In a nuclear reactor fuel element in which the liquid fuel in a fuel element shell is displaced from a lower non-critical region adjacent the bottom of the fuel element shell to a higher reactor core region consisting of an annular space surrounding a fuel displacement plunger slideably disposed in said fuel element shell and movable into said liquid fuel to displace it into said annular space, the improvement which comprises: providing a non-uniform annular space which has the greatest cross sectional area at the top and bottom of reactor core region and the smallest cross sectional area at about the vertical center of the reactor core region thereby to provide a substantially uniform neutron flux in said fuel element from top to bottom of the said reactor core region.

11. A nuclear reactor fuel element which comprises: a relatively unmoderated reservoir for liquid fuel, a plunger associated with said reservoir, a moderated zone associated with said plunger, pneumatic piston means disposed above and attached to said plunger and adapted for moving said plunger into said reservoir to transfer liquid metal from said reservoir to said moderated zone by positive displacement, said pneumatic piston means including a piston reciprocable within a complementary cylindrical space in a container, said cylindrical space being in communication with said reservoir, and liquid fertile blanket material disposed within said plunger so as to be within said moderated zone when said plunger is moved into said reservoir.

References Cited by the Examiner

UNITED STATES PATENTS

| 2,852,460 | 9/58 | Abbott et al. | 176—68 |
| 2,853,446 | 9/58 | Abbott et al. | 176—68 |
| 2,855,899 | 10/58 | Beaty | 176—36 |
| 2,975,119 | 3/61 | Emmons | 176—36 |
| 2,998,367 | 8/61 | Untermyer | 176—42 |
| 2,999,060 | 9/61 | Teitel | 176—27 |
| 3,041,263 | 6/62 | Kiehn et al. | 176—14 |

FOREIGN PATENTS

| 579,111 |  | Belgium | 176—21 |
| 1,178,800 | 5/59 | France. | |
| 1,226,062 | 2/60 | France | 176—21 |

OTHER REFERENCES

Goetzel et al.: Nucleonics, vol. 12, No. 9, September 1954, pp. 42–45.

Lampre: A Molten Plutonium Fueled Reactor Concept (LA–2112), January 1957, pp. 1–14, USAEC document.

Nucleonics, vol. 12, No. 7, July 1954, pp. 11–13.

Nucleonics, vol. 13, No. 2, February 1955, pp. 18–22.

Nucleonics, vol. 15, No. 2, February 1957, pp. 48–52.

CARL D. QUARFORTH, *Primary Examiner.*

OSCAR R. VERTIZ, LEON D. ROSDOL, *Examiners.*